United States Patent
Hijiya et al.

(10) Patent No.: US 10,773,991 B2
(45) Date of Patent: Sep. 15, 2020

(54) SODA-LIME GLASS

(71) Applicant: AGC Inc., Chiyoda-ku (JP)

(72) Inventors: Hiroyuki Hijiya, Tokyo (JP); Kensuke Nagai, Tokyo (JP); Eriko Maeda, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 71 days.

(21) Appl. No.: 15/958,032

(22) Filed: Apr. 20, 2018

(65) Prior Publication Data

US 2018/0237334 A1 Aug. 23, 2018

Related U.S. Application Data

(63) Continuation of application No. PCT/JP2016/081595, filed on Oct. 25, 2016.

(30) Foreign Application Priority Data

Oct. 28, 2015 (JP) .................................. 2015-211679

(51) Int. Cl.
| | | |
|---|---|---|
| C03C 3/087 | (2006.01) | |
| C03C 3/097 | (2006.01) | |
| C03C 3/078 | (2006.01) | |
| C03C 3/095 | (2006.01) | |

(52) U.S. Cl.
CPC .............. C03C 3/087 (2013.01); C03C 3/078 (2013.01); C03C 3/095 (2013.01)

(58) Field of Classification Search
CPC ................................. C03C 3/078; C03C 3/095
See application file for complete search history.

(56) References Cited

U.S. PATENT DOCUMENTS

| | | | |
|---|---|---|---|
| 4,792,536 A * | 12/1988 | Pecoraro | ................... C03B 3/02 501/70 |
| 5,380,685 A | 1/1995 | Morimoto et al. | |
| 5,977,002 A | 11/1999 | Boulos et al. | |
| 6,035,665 A | 3/2000 | Boulos et al. | |
| 6,114,264 A | 9/2000 | Krumwiede et al. | |
| 6,170,292 B1 | 1/2001 | Boulos et al. | |
| 6,413,893 B1 * | 7/2002 | Shelestak | ................ C03C 3/087 501/70 |
| 8,455,066 B2 | 6/2013 | Heithoff et al. | |
| 2001/0034295 A1 | 10/2001 | Seto et al. | |
| 2003/0216242 A1 | 11/2003 | Arbab et al. | |
| 2005/0164863 A1 | 7/2005 | Coster et al. | |
| 2013/0105722 A1 | 5/2013 | Tsuzuki et al. | |

FOREIGN PATENT DOCUMENTS

| | | | |
|---|---|---|---|
| JP | 06-234543 | 8/1994 | |
| JP | 10-072236 | 3/1998 | |
| JP | 2000-143287 | 5/2000 | |
| JP | 2002-507539 | 3/2002 | |
| JP | 2002-338298 | 11/2002 | |
| JP | 2002338298 A * | 11/2002 | ............. C03C 4/085 |
| JP | 2003-502258 | 1/2003 | |
| JP | 2003-342039 | 12/2003 | |
| JP | 2005-521614 | 7/2005 | |
| JP | 2011-251882 | 12/2011 | |

OTHER PUBLICATIONS

International Search Report dated Nov. 29, 2016 in PCT/JP2016/081595 filed Oct. 25, 2016 (with English Translation).
Written Opinion dated Nov. 29, 2016 in PCT/JP2016/081595 filed Oct. 25, 2016.
Larry J. Shelestak, et al., "Investigation of selenium retention in high redox glasses," Glass Sci. Technol. 78, No. 6, 2005, pp. 255-260.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

In a soda lime glass, a content of total iron calculated as $Fe_2O_3$, expressed in mass % on an oxide basis, is 0.25 to 1%, a mass proportion of divalent iron calculated as $Fe_2O_3$ in the total iron calculated as $Fe_2O_3$ is 30 to 50%, a content of total sulfur calculated as $SO_3$, expressed in mass % on an oxide basis, is 0.003 to 0.1%, and a content of Se is 3 mass ppm or more. In the soda lime glass, visible light transmittance $Tv_{D65}$ is 30 to 55% calculated as 6 mm thickness of a glass sheet, solar direct transmittance Te is 20 to 40% calculate as 6 mm thickness of a glass sheet, and excitation purity Pe is 8.0% or less calculated as 6 mm thickness of a glass sheet.

17 Claims, 1 Drawing Sheet

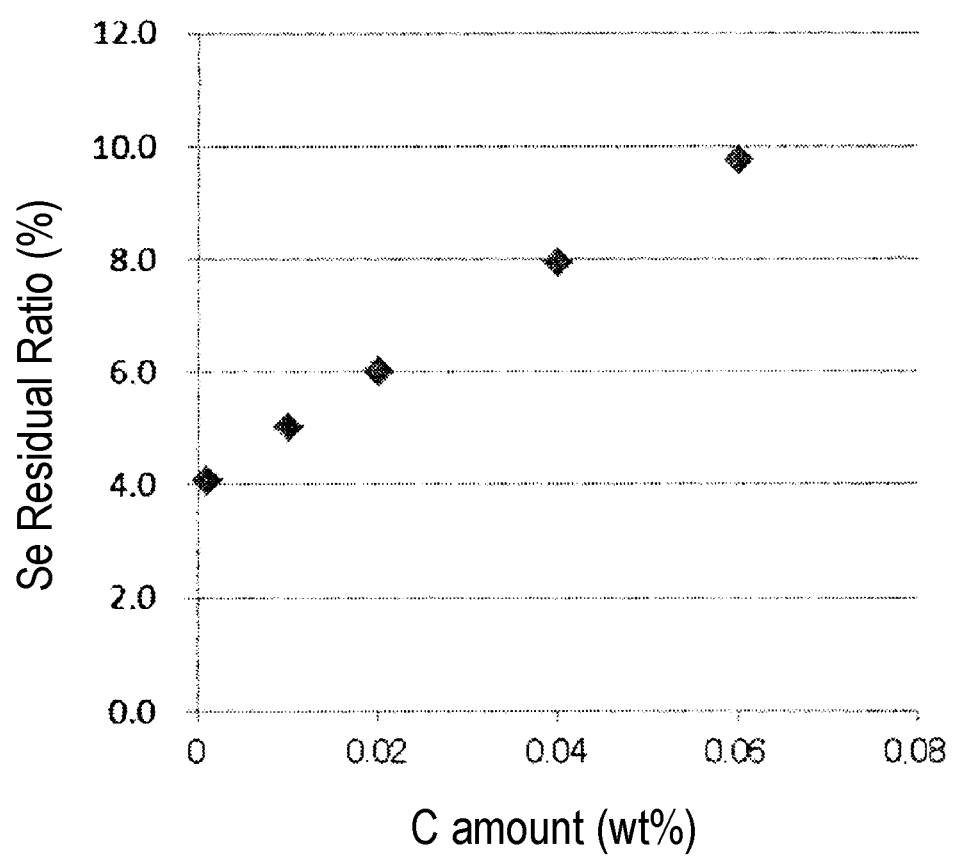

12 # SODA-LIME GLASS

TECHNICAL FIELD

The present invention relates to a soda lime glass which can be used suitably as a window glass for a building, a vehicle, or the like.

BACKGROUND ART

A gray-colored soda lime glass (soda lime glass will be also simply referred to as glass) may be used as a window glass for a building, a vehicle, or the like. The gray-colored glass is required not only to be low in excitation purity (Pe) but also to be moderately low in visible light transmittance (Tv), low in solar direct transmittance (Te), and high in Tv/Te ratio. In addition, a gray glass in which an amber color has been reduced is preferred by customers.

In the gray-colored glass, various coloring components such as Se, Co, Fe, and Ni are used and combined depending on an expected color. For example, in order to obtain a bluish gray color, Fe (blue, yellow), Se (red) and Co (blue) can be added as coloring components. Of them, Se is an element which is often used for adjusting a color tone, but Se can be easily volatilized at a melting temperature of the glass. Therefore, ordinarily, only a small part of added Se remains in a final glass product (Non-Patent Literature 1).

Glasses described in Patent Literatures 1 to 4 have been known as glasses with low Pe.

CITATION LIST

Patent Literature

Patent Literature 1: U.S. Pat. No. 8,455,066
Patent Literature 2: JP-A-2000-143287
Patent Literature 3: JP-A-2003-342039
Patent Literature 4: JP-A-H10-72236

Non-Patent Literature

Non-Patent Literature 1: Glass Sci. Technol. 78 (2005), No. 6, 255-260

SUMMARY OF THE INVENTION

Technical Problems

Iron exists as divalent iron or trivalent iron in a glass. Divalent iron has a peak of absorption near a wavelength of 1,100 nm, and trivalent iron has a peak of absorption near a wavelength of 400 nm. The solar direct transmittance (Te) of the glass can be reduced when the proportion of divalent iron having a peak of absorption near the wavelength of 1,100 nm is increased. To this end, it can be considered that a reducing agent such as coke is added during manufacturing of the glass to thereby increase the mass ratio (redox ratio) of divalent iron to the total iron.

However, as has been known, when the redox ratio is increased by addition of the reducing agent such as coke, volatilization of selenium (Se) from a melt is promoted to reduce the residual ratio of Se. The residual ratio of Se is a percentage indicating how much of the amount of Se added as a glass raw material remains in a produced glass. Non-Patent Literature 1 reports that when the redox ratio is increased from 20% to 35%, the residual ratio of Se falls suddenly from about 20% down to about 3 to 5%, and even when the redox ratio is further increased to about 60%, the residual ratio of Se increases no longer but remains flat. Se is expensive, and therefore, when the added amount of Se is increased to compensate a volatilized part of Se, the cost is increased. In addition, from an environmental viewpoint, it is not favorable that the Se component is volatilized during manufacturing of the glass.

Further, addition of a reducing agent may give an amber color to the glass. That is, salt cake ($Na_2SO_4$) as a fining agent for removing bubbles may be added to the melt, and as a result, sulfur (S) derived from the fining agent may be contained in the glass. As the addition amount of the salt cake increases, the refining effect is enhanced. Here, the sulfur exists as a divalent sulfur anion or a hexavalent sulfur cation (hereinafter simply referred to as sulfur). Although the hexavalent sulfur is colorless, the minus divalent sulfur has a peak of absorption near a wavelength of 420 nm and gives an amber color to the glass. Thus, under the existence of the reducing agent, it is likely that the sulfur as $S^{2-}$ may provide an undesired amber color. The amber coloration leads to deterioration (increase) of Pe. However, the mechanism of the amber coloration has not yet been understood in detail. Thus, the amber color makes it difficult to control the color of the glass.

As described above, due to apparently conflicting restrictions belonging to respective components, it is difficult to manufacture a glass having desired optical properties, a desired color tone, desired clarity, etc.

An object of an embodiment of the present invention is to provide a gray-colored glass which is low in Pe, moderately low in Tv and low in Te and in which amber coloration is prevented in spite of sulfur contained in the glass.

Solution to Problems

In the soda lime glass in the present invention, a content of total iron calculated as $Fe_2O_3$, expressed in mass % on an oxide basis, is 0.25 to 1%, a mass proportion of divalent iron calculated as $Fe_2O_3$ in the total iron calculated as $Fe_2O_3$ is 30 to 50%, a content of total sulfur calculated as $SO_3$, expressed in mass % on an oxide basis, is 0.003 to 0.1%, a content of Se expressed in mass ppm is 3 ppm or more, visible light transmittance $Tv_{D65}$ in accordance with ISO-9050:2003 is 30 to 55% calculated as 6 mm thickness of a glass sheet, solar direct transmittance Te in accordance with ISO-13837A:2008 is 20 to 40% calculate as 6 mm thickness of a glass sheet, and excitation purity Pe in accordance with JIS Z 8701(1999) is 8.0% or less calculated as 6 mm thickness of a glass sheet.

Advantageous Effects of the Invention

An embodiment of the present invention provides a gray-colored soda lime glass which is low in Pe, moderately low in Tv, low in Te and high in Tv/Te, and in which amber coloration is prevented in spite of use of a sulfur-based fining agent. The soda lime glass in the embodiment of the present invention can be manufactured in a low-cost and environment-friendly method while reducing the amount of volatilized Se.

BRIEF DESCRIPTION OF THE DRAWINGS

FIG. 1 is a graph showing a relationship between the added amount of coke (C) as a reducing agent and the residual ratio of Se in manufacturing of a glass in Examples.

DESCRIPTION OF EMBODIMENTS

First, terms used in the present description will be described. As long as not mentioned otherwise, the following definitions of the terms are applied to the whole of the present description and the claims.

The expression "to" indicating a numerical range is used in the sense to include the numerical values described before and after the expression as the lower limit and the upper limit. As long as not explained otherwise, "%" means "mass %".

The content of total iron is expressed as calculated as $Fe_2O_3$ in accordance with the standard method of analysis. All the iron in a glass does not exist as trivalent iron, and divalent iron also exists. Of the total iron calculated as $Fe_2O_3$, the mass proportion (percentage) of divalent iron calculated as $Fe_2O_3$ may be referred to as Fe-Redox.

In the same manner, the content of total sulfur is expressed as calculated as $SO_3$ in accordance with the standard method of analysis. All the sulfur in a glass does not exist as hexavalent sulfur, and minus divalent sulfur also exists. In addition, the content of total cobalt is expressed as calculated as CoO in accordance with the standard method of analysis.

Visible light transmittance Tv is expressed as visible light transmittance $Tv_{D65}$ calculated from transmittance measured by a spectrophotometer using a Illuminant D65 in accordance with ISO-9050:2003.

Solar direct transmittance Te is solar direct transmittance calculated from transmittance measured by a spectrophotometer in accordance with ISO-13837A:2008. A value $Tv_{D65}$/Te which is a ratio of $Tv_{D65}$ to Te is sometimes referred to as selectivity.

Excitation purity Pe is excitation purity calculated in accordance with JIS Z 8701 (1999).

A dominant wavelength Dw of transmitted light is a dominant wavelength of transmitted light calculated in accordance with JIS Z 8701 (1999).

An L*a*b color space is based on the standard of JIS Z 8781-4:2013.

"Soda lime glass" means a glass containing $SiO_2$ as its main component and also containing $Na_2O$, CaO, etc., as is ordinarily understood by those skilled in the art. The soda lime glass in the embodiment of the present invention preferably contains, in mass % on an oxide basis:

$SiO_2$: 65 to 75%
$Al_2O_3$: 0 to 6%
MgO: 0 to 10%
CaO: 5 to 12%
$Na_2O$: 5 to 18%
$K_2O$: 0 to 5%

The respective components and properties of the soda lime glass in the embodiment of the present invention will be described below.

[$SiO_2$: 65 to 75%]

$SiO_2$ is a main component of the soda lime glass.

When the content of $SiO_2$ is 65% or more, the weather resistance is improved. The content of $SiO_2$ is preferably 66% or more, more preferably 67% or more, and further more preferably 68% or more. When the content of $SiO_2$ is 75% or less, the glass is hardly devitrified. The content of $SiO_2$ is preferably 74% or less, more preferably 73.5% or less, and further more preferably 73% or less.

[$Al_2O_3$: 0 to 6%]

$Al_2O_3$ is an optional component for improving the weather resistance.

When the glass contains $Al_2O_3$, the weather resistance is improved. The content of $Al_2O_3$ is preferably 0.1% or more, more preferably 0.2% or more, and further more preferably 0.3% or more. When the content of $Al_2O_3$ is 6% or less, the melting performance is improved. The content of $Al_2O_3$ is preferably 5% or less, and more preferably 4% or less.

[MgO: 0 to 10%]

MgO is an optional component for promoting the melting of a glass raw material and improving the weather resistance.

When the glass contains MgO, the melting performance and the weather resistance are improved. The content of MgO is preferably 0.1% or more, more preferably 0.3% or more, and further more preferably 0.5% or more. When the content of MgO is 10% or less, the glass is hardly devitrified. The content of MgO is preferably 9% or less, more preferably 8% or less, and further more preferably 7% or less.

[CaO: 5 to 12%]

CaO is a component for promoting the melting of the glass raw material and improving the weather resistance.

When the content of CaO is 5% or more, the melting performance and the weather resistance are improved. The content of CaO is preferably 6% or more, more preferably 6.5% or more, and further more preferably 7% or more. When the content of CaO is 12% or less, the glass is hardly devitrified. The content of CaO is preferably 11% or less, and more preferably 10% or less.

[$Na_2O$: 5 to 18%]

$Na_2O$ is a component for promoting the melting of the glass raw material.

When the content of $Na_2O$ is 5% or more, the melting performance is improved. The content of $Na_2O$ is preferably 8% or more, more preferably 11% or more, and further more preferably 12% or more. When the content of $Na_2O$ is 18% or less, the weather resistance is improved. The content of $Na_2O$ is preferably 17% or less, more preferably 16% or less, and further more preferably 15% or less.

[$K_2O$: 0 to 5%]

$K_2O$ is an optional component for promoting the melting of the glass raw material.

When the glass contains $K_2O$, the melting performance is improved. When the content of $K_2O$ is 5% or less, the weather resistance is improved. The content of $K_2O$ is preferably 4% or less, more preferably 3% or less, and further more preferably 2% or less.

The soda lime glass in the embodiment of the present invention contains iron (Fe). Iron has an effect of reducing Te and Tv, and also serves as a coloring component of blue, green or yellow.

In the soda lime glass in the embodiment of the present invention, the content of total iron calculated as $Fe_2O_3$ (hereinafter simply referred to as $Fe_2O_3$) expressed in mass % on the oxide basis is 0.25 to 1%. When the content of total iron falls within the range, Te can be adjusted easily to the range of 20 to 40% calculated as 6 mm thickness of a glass sheet, and $Tv_{D65}$ can be adjusted easily to the moderate range of 30 to 55% calculated as 6 mm thickness of the glass sheet. The content of $Fe_2O_3$ is preferably 0.27% or more, more preferably 0.28% or more, and further more preferably 0.29% or more. On the other hand, the content of $Fe_2O_3$ is preferably 0.9% or less, more preferably 0.8% or less, further more preferably 0.75% or less, and much more preferably 0.7% or less.

As described previously, divalent iron has a peak of absorption near a wavelength of 1,100 nm, and trivalent iron has a peak of absorption near a wavelength of 400 nm. Accordingly, in order to absorb infrared rays to thereby reduce Te, and in order to transmit rays near 400 nm to thereby make the glass into a bluish gray glass, it is preferable to increase the ratio of divalent iron to total iron (or to trivalent iron), that is, to increase Fe-Redox.

Fe-Redox in the soda lime glass in the embodiment of the present invention is 30 to 50%. When Fe-Redox is 30% or more, Te can be reduced to be sufficiently low, and can enhance the selectivity. Fe-Redox is preferably 31% or more, more preferably 32% or more, and further more preferably 34% or more. On the other hand, when Fe-Redox is too high, not only the step of melting the glass is complicated, but also there arises a problem that amber coloration occurs due to reduction of sulfur. Fe-Redox is preferably 48% or less, more preferably 45% or less, further more preferably 43.5% or less, and particularly preferably 43% or less.

The soda lime glass in the embodiment of the present invention contains sulfur (S). The sulfur chiefly derives from salt cake ($Na_2SO_4$) used as a fining agent.

In the soda lime glass in the embodiment of the present invention, the content of total sulfur calculated as $SO_3$ (hereinafter also simply referred to as $SO_3$) expressed in mass % on the oxide basis is 0.003% to 0.1%. When the content of $SO_3$ is 0.003% or more, the fining effect during the melting of the glass is improved to reduce bubbles. The content of $SO_3$ is preferably 0.0035% or more, more preferably 0.004% or more, and further more preferably 0.005% or more. The content of $SO_3$ is 0.1% or less. When the content of $SO_3$ is 0.1% or less, the amber coloration can be prevented sufficiently. The content of $SO_3$ is preferably 0.08% or less, more preferably 0.07% or less, and further more preferably 0.05% or less. The soda lime glass in the embodiment of the present invention contains $Na_2SO_4$ which is used as a fining agent in the raw material. Of the total sulfur contained in the soda lime glass in the present invention, preferably 80% or more, more preferably 90% or more, and further more preferably 95% or more derives from $Na_2SO_4$ contained in the raw material.

A tin (Sn) component may be contained for preventing the amber color or fining. However, tin which is expensive is not preferred from the viewpoint of the cost. $Na_2SO_4$ can be used as a fining agent in the glass in the embodiment of the present invention. It is therefore unnecessary to add the tin component. That is, in the embodiment of the invention, $Na_2SO_4$ may be used alone as a fining agent, or may be used together with another fining agent. In the former case, the soda lime glass in the embodiment of the present invention substantially (that is, except for a case where tin is mixed as unavoidable impurity) does not contain tin. The phrase "substantially not contain tin" herein means that total $SnO_2$ is 0.01% or less. In the latter case, a tin component or another fining agent component is contained.

The soda lime glass in the embodiment of the present invention contains selenium (Se). Selenium is a component which reduces Pe to be low, and also serves as a red coloring component.

In the soda lime glass in the embodiment of the present invention, the content of Se expressed in mass ppm is 3 ppm or more (0.0003% or more, expressed in mass %). When the content of Se is 3 ppm or more, Pe can be reduced to be sufficiently low. The content of Se is preferably 3.5 ppm or more, more preferably 4 ppm or more, further more preferably 5 ppm or more, particularly preferably 5.5 ppm or more, and most preferably 6 ppm or more. When an excessive amount of Se is added, there is a possibility that $Tv_{D65}$ may be lower than necessary, as will be described later. In addition, the excessive amount of Se is not favorable from the viewpoint of the cost. The content of Se is normally 50 ppm or less, preferably 20 ppm or less, and more preferably 14 ppm or less.

The soda lime glass in the embodiment of the present invention preferably contains cobalt (Co) in addition to selenium. Cobalt is a blue coloring component, and has a function of reducing Pe to be low as in the case of selenium.

In the soda lime glass in the embodiment of the present invention, the content of total cobalt calculated as CoO (hereinafter also simply referred to as CoO) expressed in mass ppm on the oxide basis is preferably 1 to 100 ppm (0.0001 to 0.01%, expressed in mass %). When the content of CoO is 1 ppm or more, the effect of reducing Pe can be obtained sufficiently. The content of CoO is more preferably 10 ppm or more, and further more preferably 15 ppm or more. When the content of CoO is 100 ppm or less, required Tv can be ensured. The content of CoO is more preferably 95 ppm or less, further more preferably 90 ppm or less, and much more preferably 85 ppm or less.

Although there is a case that NiO is used as a coloring component for a gray glass, the addition of NiO is not required in the embodiment of the present invention. That is, the soda lime glass in the embodiment of the present invention preferably substantially (that is, except for a case where nickel is mixed as unavoidable impurity) does not contain a nickel (Ni) component. The phrase "substantially not contain a nickel component" herein means that NiO is, for example, 0.01% or less.

Although there is a case that $MnO_2$ or MnO is used as a coloring component for a gray glass, the addition of $MnO_2$ or MnO is not required in the embodiment of the present invention. That is, $MnO_2$ or MnO leads to solarization, causing discoloration. Therefore, $MnO_2$ or MnO is not suitable for a gray glass to be used for a long time.

The soda lime glass in the embodiment of the present invention preferably substantially (that is, except for a case where manganese is mixed as unavoidable impurity) does not contain a manganese (Mn) component. The phrase "substantially not contain a manganese component" herein means that $MnO_2$ or MnO is, for example, 0.0015% or less (preferably 0.001% or less and more preferably 0.0005% or less).

A soda lime glass in the embodiment of the present invention may contain only $Fe_2O_3$ and Se or only $Fe_2O_3$, Se and CoO as coloring components. It is, however, not excluded to contain a nickel component or another coloring component in another embodiment of the present invention.

A soda lime glass in the embodiment of the present invention may contain respective oxides of Cu, Mo, Nd, and Er. The content thereof on the oxide basis (CuO, $MoO_3$, $Nd_2O_3$, and $Er_2O_3$) may be 0.1% or less, 0.05% or less, or 0.01% or less, or the oxides may be substantially not contained (that is, except that the oxides are mixed as unavoidable impurities). The phrase "substantially not contained" herein means that the content of the oxides is 0.015% or less.

In addition, $CeO_2$ may be contained. When $CeO_2$ is contained, the content of $CeO_2$ may be 1% or less. The content of $CeO_2$ may be preferably 0.7% or less, more preferably 0.4% or less, further more preferably 0.2% or less, and particularly preferably 0.1% or less. Since the raw material cost of $CeO_2$ is high, $CeO_2$ may be substantially not contained (that is, except that $CeO_2$ is mixed as unavoidable impurities). The phrase "substantially not contained" herein means that the content of $CeO_2$ is 0.01% or less.

It is preferable that respective oxides of V and W are substantially not contained. The phrase "substantially not contained" herein means that those oxides are not contained except that they are mixed as unavoidable impurities, and specifically means that the content of each of those elements in the glass is 0.01% or less.

The soda lime glass in the embodiment of the present invention may contain respective oxides of B, Ba, Sr, Li, Zn, Pb, P, Zr and Bi in addition to the aforementioned oxides. The content of each of those oxides ($B_2O_3$, BaO, SrO, $Li_2O$, ZnO, PbO, $P_2O_5$, $ZrO_2$, and $Bi_2O_3$) on the oxide basis may be 1% or less. The content of each oxide component is preferably 0.7% or less, more preferably 0.4% or less, further more preferably 0.2% or less, and particularly preferably 0.1% or less. The oxides may be substantially not contained (that is, except that the oxides are mixed as unavoidable impurities). The phrase "substantially not contained" herein means that the total content of the oxides is 0.01% or less.

In addition, Sb, As, Cl or F may be contained. Those elements may be mixed intentionally from a melting aid or a fining agent. Or the elements can be contained as impurities in the raw material or cullet. The content of the elements may be 0.1% or less, 0.05% or less, or 0.01% or less. The elements may be substantially not contained (that is, except that the elements are mixed as unavoidable impurities). The phrase "substantially not contained" herein means that the content of the elements is 0.005% or less (preferably 0.001% or less, more preferably 0.0005% or less, and further more preferably zero).

$Tv_{D65}$ of the soda lime glass in the embodiment of the present invention is 30 to 55% calculated as 6 mm thickness of a glass sheet. This is a visible light transmittance particularly useful as a gray glass for a building, a vehicle, or the like. $Tv_{D65}$ is preferably 35% or more and more preferably 37% or more, calculated as 6 mm thickness of the glass sheet. In addition, $Tv_{D65}$ is preferably 53% or less, more preferably 52% or less, further more preferably 51% or less and most preferably 50% or less, calculated as 6 mm thickness of the glass sheet.

Te of the soda lime glass in the embodiment of the present invention is 20 to 40% calculated as 6 mm thickness of the glass sheet. This is a solar direct transmittance particularly useful as a gray glass for a building, a vehicle, or the like. Te is preferably 21% or more and more preferably 22% or more, calculated as 6 mm thickness of the glass sheet. In addition, Te is preferably 39% or less and more preferably 38% or less, calculated as 6 mm thickness of the glass sheet.

The value $Tv_{D65}$/Te which is a ratio of $Tv_{D65}$ to Te in the soda lime glass in the embodiment of the present invention is preferably 1.0 or more calculated as 6 mm thickness of the glass sheet. The ratio $Tv_{D65}$/Te of lower than 1.0 means that the solar direct transmittance is too high relatively to the visible light transmittance, not favorably particularly as a gray glass for a building, a vehicle or the like. The ratio $Tv_{D65}$/Te is more preferably 1.05 or more and further more preferably 1.09 or more, calculated as 6 mm thickness of the glass sheet.

Pe of the soda lime glass in the embodiment of the present invention is 8.0% or less calculated as 6 mm thickness of the glass sheet. When Pe is 8.0% or less, light transmitted by the soda lime glass has a color tone close to an achromatic color (gray). Pe is preferably 6.0% or less, more preferably 4.0% or less and further more preferably 3.0% or less, calculated as 6 mm thickness of the glass sheet.

In the soda lime glass in the embodiment of the present invention, it is preferable that the following relationship is established between Pe and the dominant wavelength Dw (mm) of transmitted light:

$$416 \leq Dw \leq 586 \text{ when } 0 \leq Pe \leq 2.3$$

Dw is more preferably 418 nm or more and further more preferably 420 nm or more, and also more preferably 584 nm or less and further more preferably 582 nm or less;

$$470 \leq Dw \leq 524 \text{ when } 2.3 \leq Pe \leq 3.0$$

Dw is more preferably 475 nm or more and further more preferably 480 nm or more, and also more preferably 522 nm or less and further more preferably 520 nm or less; and $$470 \leq Dw \leq 520 \text{ when } 3.0 \leq Pe \leq 8.0$$

Dw is more preferably 475 nm or more and further more preferably 480 nm or more, and also more preferably 518 nm or less and further more preferably 516 nm or less.

When Pe and Dw satisfy the aforementioned relationship, a gray glass in which the amber color has been prevented suitably as a gray glass for a building, a vehicle or the like is obtained.

It is preferable that the soda lime glass in the embodiment of the present invention has a color tone satisfying $-11 \leq a^* \leq 1$ and $-10 \leq b^* \leq 10$ as a coordinate in the $L^*a^*b^*$ color space. When the coordinate in the $L^*a^*b^*$ color space falls within the ranges, a gray glass which has a color suitable as a gray glass for a building, a vehicle or the like is obtained.

In the embodiment of the present invention, $Fe^{2+}$ gives influence to blue coloration, $Fe^{3+}$ gives influence to yellow coloration, Se gives influence to red coloration and Co gives influence to blue coloration, and those components also give influence to transmittance at each wavelength within a visible light region. In addition, Fe-Redox gives influence to the thermal insulation performance. The thermal insulation performance can be enhanced when Fe-Redox is increased. In order to obtain a gray glass having predetermined Tv, Te and Pe in the present invention, it is preferable that coloring components $Fe_2O_3$ and Se (and Co) are added to adjust Fe-Redox so that parameter E can satisfy the following condition:

$$365 \leq E \leq 2710$$

wherein the parameter E is defined as follows.

$$E = -10 \times [Fe_2O_3] \times [\text{Fe-Redox}]/100 + (65 \times [Fe_2O_3] \times (1-[\text{Fe-Redox}]/100))^2 + 0.5 \times [Se] + 0.58 \times [CoO]^{1.76}$$

Here, $[Fe_2O_3]$ is the content of total iron calculated as $Fe_2O_3$ (mass % on the oxide basis), [Fe-Redox] is the mass proportion (%) of divalent iron calculated as $Fe_2O_3$ in the total iron calculated as $Fe_2O_3$, [Se] is the content of Se (mass ppm), and [COO] is the content of total Co calculated as CoO (mass ppm on the oxide basis).

The parameter E in the embodiment of the present invention is preferably 380 or more, more preferably 400 or more, further more preferably 450 or more, and particularly preferably 500 or more. In addition, the parameter E is preferably 2,500 or less, more preferably 2,200 or less, further more preferably 1,900 or less, and particularly preferably 1,600 or less.

Further, in the soda lime glass in the embodiment of the present invention, in order to prevent the amber coloration and improve the bubble removing property while keeping the thermal insulation performance and the gray color, it is preferable that parameter M satisfies the following condition:

$$400 \leq M \leq 2900$$

wherein the parameter M is defined as follows.

$$M = E + 1000 \times [SO_3]$$

Here, [SO₃] is the content of total residual sulfur calculated as $SO_3$ (mass % on the oxide basis).

The parameter M in the embodiment of the present invention is preferably 450 or more, more preferably 480 or more, further more preferably 500 or more, and particularly preferably 550 or more. In addition, the parameter M is preferably 2,500 or less, more preferably 2,200 or less, further more preferably 1,900 or less, and particularly preferably 1,600 or less.

The present inventors found that increase in the added amount of a reducing agent such as coke can increase the residual ratio of selenium under the aforementioned specific conditions, particularly under the conditions where the total iron content and Fe-Redox fall within the aforementioned ranges, contrary to understanding in the art. That is, under the manufacturing conditions of the glass in the embodiment of the present invention, high Se residual ratio reaching 10% can be achieved by increase of the added amount of a reducing agent falling within the Fe-Redox range of 30 to 50%.

Accordingly, a glass sheet made of the soda lime glass in the embodiment of the present invention can be manufactured as follows. That is, a glass raw material is prepared to have a final composition as described above; the raw material are melted at 1,400° C. to 1,500° C. in a melting furnace under the presence of a reducing agent such as coke, thereby obtaining molten glass; and the molten glass is shaped. Here, the added amount of the reducing agent during the melting is an amount with which Fe-Redox of 30 to 50% can be achieved. Specifically, when the amount of the glass raw material is regarded as 100%, the added amount of the reducing agent (such as coke) is, for example, 0.001% or more, preferably 0.005% or more, more preferably 0.01% or more, further more preferably 0.02% or more, and much more preferably 0.03% or more.

In addition, the residual ratio of Se remaining in the shaped glass is 3.33% or more, preferably 4% or more, more preferably 4.5% or more, further more preferably 5.0% or more, and much more preferably 6.0% or more relative to Se added to the raw material.

That is, the added amount of Se is 30 times or less, preferably 25 times or less, more preferably 22 times or less, further more preferably 20 times or less and particularly preferably 17 times or less as large as the residual ratio.

Besides coke, sugar or another organic compound weighed correspondingly to the coke may be used as the reducing agent, or they may be used in combination. Those reducing agents provide a reducing effect on a glass material in a melt, but the reducing agents themselves do not remain in a final glass product. Polyvalent oxides or metals may be used as reducing agents, but a reducing agent which cannot remain in the glass is preferred. Coke which is inexpensive is particularly preferred.

EXAMPLES

The present invention will be specifically described below with reference to Examples, but the present invention is not limited thereto.

Cases 1 to 22 and Cases 27 to 31 are Examples, and Cases 23 to 26 are Comparative Examples.

A raw material was mixed into a platinum crucible to have a glass composition shown in mass % in the following Table 1, and melted at a temperature of 1,500° C. for 2 hours. A melt obtained thus was made to flow onto a carbon sheet and cooled gradually. In this manner, sheets of soda lime glasses in Cases 1 to 5 were manufactured. Both sides of each of the obtained sheets were polished to obtain a glass sheet having a thickness of 6 mm.

Table 1 shows, together with the composition of each Case, Fe-Redox, the amount of Se (Se added) added as a raw material, the amount of coke (C added) added as a reducing agent, the residual ratio of Se (Se residual %=[Se]/[Se added]×100) remaining in the glass, and the ratio of Se in the raw material of the glass to Se remaining in the soda lime glass, that is, Se added/Se. Here, the Se added and the C added are expressed in mass % as a relative amount of Se or C added when the raw material of the glass is melted, on the assumption that the amount of the raw material of the glass is regarded as 100 mass %.

TABLE 1

|  | Case 1 | Case 2 | Case 3 | Case 4 | Case 5 |
| --- | --- | --- | --- | --- | --- |
| $SiO_2$ | 72.4 | 72.4 | 72.4 | 72.4 | 72.4 |
| $Al_2O_3$ | 0.45 | 0.45 | 0.45 | 0.45 | 0.45 |
| MgO | 4.2 | 4.2 | 4.2 | 4.2 | 4.2 |
| CaO | 8.9 | 8.9 | 8.9 | 8.9 | 8.9 |
| $Na_2O$ | 13.4 | 13.4 | 13.4 | 13.4 | 13.4 |
| $K_2O$ | 0.09 | 0.09 | 0.09 | 0.09 | 0.09 |
| $Fe_2O_3$ | 0.3 | 0.3 | 0.3 | 0.3 | 0.3 |
| $SO_3$ | 0.073 | 0.067 | 0.061 | 0.05 | 0.042 |
| Se | 0.00053 | 0.00065 | 0.00078 | 0.00103 | 0.00127 |
| CoO | 0.0071 | 0.0071 | 0.0071 | 0.0071 | 0.0071 |
| Fe-Redox | 32 | 35 | 37 | 42 | 47 |
| C added | 0.001 | 0.01 | 0.02 | 0.04 | 0.06 |
| Se added | 0.013 | 0.013 | 0.013 | 0.013 | 0.013 |
| Se residual % | 4.1 | 5 | 6 | 7.9 | 9.7 |
| Se added/Se | 25 | 20 | 17 | 13 | 10 |

In the surface of each of the glasses obtained thus, X-ray intensity of each component was measured for quantitative analysis by use of a X-ray fluorescence apparatus (XRF) (ZSX100e manufactured by Rigaku Corporation). Thus, the aforementioned composition was confirmed.

In addition, Fe-Redox was calculated from a spectral curve of the glass measured by a spectrophotometer (Lambda950 manufactured by Perkin Elmer Inc.). The amount of divalent iron determined from the spectral curve was converted into a mass of $Fe_2O_3$ as described above, and then used for calculating Fe-Redox.

FIG. 1 is a graph showing the relationship between the added amount of coke (C) as a reducing agent and the residual ratio of Se in the manufacturing of each of the glasses in Cases 1 to 5. In the manufacturing of the glass in the embodiment of the present invention, it is clear that the residual ratio of Se increases with increase in the added amount of the reducing agent (and hence the increase in Fe-Redox) while Fe-Redox falls within the range of 30 to 50%.

Glasses in Cases 6 to 22 and Cases 27 to 31 were manufactured in the same manner as in Cases 1 to 5. For each of the glasses, the composition, Fe-Redox, parameters E and M and other parameters described below were determined.

($Tv_{D65}$)

As for each of obtained glass sheets, visible light transmittance $Tv_{D65}$ in accordance with ISO-9050:2003 (a value under measuring conditions of a Illuminant D65 and a 2° visual field) was obtained as calculated as 6 mm thickness of a glass sheet.

(Te)

As for each of obtained glass sheets, solar direct transmittance Te in accordance with ISO-13837A:2008 was obtained as calculated as 6 mm thickness of the glass sheet.

(Selectivity)

Selectivity designates a value $Tv_{D65}/Te$ as described above.

(Pe)

As for each of the obtained glass sheets, excitation purity Pe in accordance with JIS Z 8701(1999) was obtained as calculated as 6 mm thickness of the glass sheet.

(Dw)

As for each of the obtained glass sheets, a dominant wavelength Dw of transmitted light in accordance with JIS Z 8701(1999) was obtained as calculated as 6 mm thickness of the glass sheet.

(Coordinate in L*a*b* Color Space)

From a transmittance spectrum of a glass sample, X, Y and Z coordinates (XYZ color system) were calculated, and converted therefrom into a*b* coordinates.

Results are shown in Tables 2 to 5 where they are compared with soda lime glasses (Cases 23 to 26) in the background art. In Tables 2 to 5, the content of each component is expressed in mass %, and values of optical properties are expressed as calculated as 6 mm thickness of the glass sheet. The sign "-" means that the component is not added. All the numerical values in Examples are measured values, and $Tv_{D65}$, Te, Pe and Dw in Comparative Examples are calculated values.

TABLE 2

|  | Case 6 | Case 7 | Case 8 | Case 9 |
|---|---|---|---|---|
| $SiO_2$ | 71.4 | 71.4 | 71.4 | 71.4 |
| $Al_2O_3$ | 1.8 | 1.8 | 1.8 | 1.8 |
| MgO | 4.3 | 4.3 | 4.3 | 4.3 |
| CaO | 8.3 | 8.3 | 8.3 | 8.3 |
| $Na_2O$ | 12.8 | 12.8 | 12.8 | 12.8 |
| $K_2O$ | 0.62 | 0.62 | 0.62 | 0.62 |
| $Fe_2O_3$ | 0.70 | 0.30 | 0.30 | 0.30 |
| $SO_3$ | 0.055 | 0.040 | 0.060 | 0.054 |
| Se | 0.00054 | 0.00073 | 0.00098 | 0.00114 |
| $CeO_2$ | — | — | — | — |
| TiO | — | — | — | — |
| CoO | 0.0019 | 0.0041 | 0.0059 | 0.0060 |
| NiO | — | — | — | — |
| Fe-Redox | 37.3 | 43.5 | 34.2 | 36.5 |
| Tv_D65 | 45.2 | 48.8 | 42.1 | 38.9 |
| Te | 24.0 | 37.1 | 37.6 | 35.4 |
| a* | −8.42 | −2.32 | −2.42 | 0.02 |
| b* | 3.18 | −1.58 | −0.95 | 1.63 |
| Pe | 2.8 | 2.8 | 2.4 | 2.1 |
| Dw | 518 | 488 | 490 | 577 |
| selectivity | 1.9 | 1.3 | 1.1 | 1.1 |
| parameter E | 913 | 526 | 919 | 930 |
| parameter M | 956 | 577 | 972 | 983 |

TABLE 3

|  | Case 10 | Case 11 | Case 12 | Case 13 | Case 14 | Case 15 | Case 16 |
|---|---|---|---|---|---|---|---|
| $SiO_2$ | 71.4 | 71.4 | 71.4 | 71.4 | 71.4 | 71.4 | 71.4 |
| $Al_2O_3$ | 1.8 | 1.8 | 1.8 | 1.8 | 1.8 | 1.8 | 1.8 |
| MgO | 4.3 | 4.3 | 4.3 | 4.3 | 4.3 | 4.3 | 4.3 |
| CaO | 8.3 | 8.3 | 8.3 | 8.3 | 8.3 | 8.3 | 8.3 |
| $Na_2O$ | 12.8 | 12.8 | 12.8 | 12.8 | 12.8 | 12.8 | 12.8 |
| $K_2O$ | 0.62 | 0.62 | 0.62 | 0.62 | 0.62 | 0.62 | 0.62 |
| $Fe_2O_3$ | 0.55 | 0.55 | 0.70 | 0.70 | 0.70 | 0.60 | 0.52 |
| $SO_3$ | 0.064 | 0.053 | 0.041 | 0.049 | 0.055 | 0.049 | 0.061 |
| Se | 0.00055 | 0.00053 | 0.00061 | 0.00065 | 0.00088 | 0.00074 | 0.00077 |
| $CeO_2$ | — | — | — | — | — | — | — |
| TiO | — | — | — | — | — | — | — |
| CoO | 0.0014 | 0.0012 | 0.0020 | 0.0020 | 0.0021 | 0.0024 | 0.0032 |
| NiO | — | — | — | — | — | — | — |
| Fe-Redox | 41.8 | 37.4 | 47.3 | 41.8 | 37.1 | 39.2 | 39.2 |
| Tv_D65 | 51.4 | 54.6 | 45.3 | 44.9 | 43.3 | 45.0 | 45.4 |
| Te | 28.7 | 31.2 | 22.3 | 23.0 | 23.5 | 25.6 | 27.9 |
| a* | −7.37 | −7.43 | −10.52 | −9.06 | −7.21 | −6.35 | −5.16 |
| b* | 0.67 | 1.86 | −1.63 | 0.86 | 2.84 | 2.44 | 0.96 |
| Pe | 3.5 | 2.6 | 7.6 | 4.4 | 2.5 | 2.1 | 2.1 |
| Dw | 499 | 507 | 493 | 499 | 520 | 519 | 503 |
| selectivity | 1.8 | 1.7 | 2.0 | 1.9 | 1.9 | 1.8 | 1.6 |
| parameter E | 496 | 546 | 685 | 812 | 945 | 721 | 683 |
| parameter M | 560 | 599 | 726 | 861 | 1000 | 770 | 744 |

TABLE 4

|  | Case 17 | Case 18 | Case 19 | Case 20 | Case 21 | Case 22 |
|---|---|---|---|---|---|---|
| $SiO_2$ | 71.4 | 71.4 | 71.4 | 71.4 | 71.4 | 71.4 |
| $Al_2O_3$ | 1.8 | 1.8 | 1.8 | 1.8 | 1.8 | 1.8 |
| MgO | 4.3 | 4.3 | 4.3 | 4.3 | 4.3 | 4.3 |
| CaO | 8.3 | 8.3 | 8.3 | 8.3 | 8.3 | 8.3 |
| $Na_2O$ | 12.8 | 12.8 | 12.8 | 12.8 | 12.8 | 12.8 |
| $K_2O$ | 0.62 | 0.62 | 0.62 | 0.62 | 0.62 | 0.62 |
| $Fe_2O_3$ | 0.30 | 0.25 | 1.0 | 0.45 | 0.30 | 0.31 |
| $SO_3$ | 0.049 | 0.038 | 0.074 | 0.055 | 0.055 | 0.055 |
| Se | 0.00078 | 0.00120 | 0.0010 | 0.00170 | 0.00140 | 0.00067 |
| $CeO_2$ | — | — | — | — | — | — |
| TiO | — | — | — | — | — | — |
| CoO | 0.0059 | 0.0048 | 0.0018 | 0.0075 | 0.0060 | 0.0041 |
| NiO | — | — | — | — | — | — |
| Fe-Redox | 45.6 | 50.0 | 30.0 | 40.0 | 40.0 | 40.0 |
| Tv_D65 | 43.8 | 43.8 | 41.6 | 30.4 | 38.5 | 52.6 |
| Te | 34.6 | 35.4 | 20.7 | 23.3 | 33.5 | 39.7 |

TABLE 4-continued

|  | Case 17 | Case 18 | Case 19 | Case 20 | Case 21 | Case 22 |
|---|---|---|---|---|---|---|
| a* | −1.92 | −0.72 | −9.91 | −1.37 | −0.01 | −3.16 |
| b* | −4.51 | −0.14 | 3.86 | −0.55 | 0.47 | −4.01 |
| Pe | 5.9 | 0.5 | 3.4 | 1.5 | 0.6 | 5.6 |
| Dw | 482 | 494 | 519 | 490 | 576 | 485 |
| selectivity | 1.3 | 1.2 | 2.0 | 1.3 | 1.1 | 1.3 |
| parameter E | 873 | 598 | 1372 | 1472 | 924 | 548 |
| parameter M | 922 | 637 | 1446 | 1527 | 979 | 603 |

TABLE 5

|  | Case 23 | Case 24 | Case 25 | Case 26 |
|---|---|---|---|---|
| $SiO_2$ | 73.11 | 70.6 | 74.23 | 72.00 |
| $Al_2O_3$ | 0.08 | 1.6 | 0.12 | 1.72 |
| MgO | 3.42 | 3.2 | 3.60 | 3.88 |
| CaO | 9.10 | 8.5 | 8.12 | 7.60 |
| $Na_2O$ | 13.92 | 13.3 | 12.94 | 12.80 |
| $K_2O$ | 0.03 | 0.8 | 0.03 | 0.68 |
| $Fe_2O_3$ | 0.102 | 0.20 | 0.66 | 0.22 |
| $SO_3$ | — | — | — | 0.3 |
| Se | 0.0003 | 0.0011 | 0.0045 | 0.0002 |
| $CeO_2$ | — | 0.65 | — | 0.79 |
| TiO | — | 0.75 | — | — |
| CoO | 0.0039 | 0.0035 | 0.013 | 0.0026 |
| NiO | — | — | — | — |
| Fe-Redox | 30.7 | 43.9 | 24.6 | 13.9 |
| Tv_D65 | 65.7 | 48.8 | 10 | 70.1 |
| Te | 66.9 | 41.3 | 15.1 | 65.2 |
| a* | −0.45 | −1.01 | −5.49 | −2.63 |
| b* | −5.92 | 5.65 | −4.48 | −2.86 |
| Pe | 5.8 | 6.7 | 9.2 | 3.8 |
| Dw | 479 | 574 | 487 | 486 |
| selectivity | 1.0 | 1.2 | 0.7 | 1.1 |
| parameter E | 388 | 360 | 4115 | 332 |
| parameter M | 388 | 360 | 4115 | 632 |

TABLE 6

|  | Case 27 | Case 28 | Case 29 | Case 30 | Case 31 |
|---|---|---|---|---|---|
| $SiO_2$ | 71.7 | 72.2 | 72.3 | 67.1 | 70.6 |
| $Al_2O_3$ | 1.9 | 1.2 | 0.7 | 5.0 | 0.1 |
| MgO | 3.5 | 3.9 | 3.9 | 0.4 | 8.2 |
| CaO | 8.8 | 8.5 | 8.8 | 12.0 | 5.2 |
| $Na_2O$ | 13.1 | 13.2 | 13.3 | 11.3 | 15.5 |
| $K_2O$ | 0.62 | 0.62 | 0.63 | 3.85 | 0.02 |
| $Fe_2O_3$ | 0.30 | 0.30 | 0.31 | 0.30 | 0.31 |
| $SO_3$ | 0.065 | 0.070 | 0.069 | 0.064 | 0.065 |
| Se | 0.0011 | 0.0012 | 0.0011 | 0.0009 | 0.0015 |
| $CeO_2$ | — | — | — | — | — |
| TiO | — | — | — | — | — |
| CoO | 0.0061 | 0.0062 | 0.0061 | 0.0050 | 0.0067 |
| NiO | — | — | — | — | — |
| Fe-Redox | 35.0 | 37.0 | 38.5 | 37.2 | 38.8 |
| Tv_D65 | 41.9 | 40.9 | 41.4 | 41.5 | 36.5 |
| Te | 37.5 | 36.1 | 35.5 | 35.5 | 33.2 |
| a* | −0.4 | −0.3 | −0.8 | −0.7 | 0.0 |
| b* | −1.6 | −1.5 | −2.6 | −1.5 | 4.6 |
| Pe | 1.9 | 1.8 | 3.3 | 2.1 | 6.2 |
| Dw | 481 | 480 | 482 | 483 | 517 |
| selectivity | 1.1 | 1.1 | 1.2 | 1.2 | 1.1 |
| parameter E | 971 | 988 | 960 | 568 | 964 |
| parameter M | 1036 | 1058 | 1029 | 632 | 1029 |

From Tables 2 to 4 and Table 6, it is found that each of the soda lime glasses in Examples (Cases 6 to 22 and Cases 27 to 31) attains $Tv_{D65}$ within the range of 30 to 55%, Te within the range of 20 to 40% and selectivity of 1.0 or more in spite of low Pe of 8.0% or less. In addition, in each of the soda lime glasses in Examples, bubbles are reduced due to the addition of $Na_2SO_4$ in the glass raw material, and amber coloration is prevented. Thus, the soda lime glass has a gray color in which the amber color has been prevented, as shown by a*, b* and Dw. In addition, in the soda lime glass in each Example, the parameter E satisfies the condition of $365 \leq E \leq 2710$.

On the other hand, as shown in Table 5, each of the soda lime glasses in Comparative Examples (Cases 23 to 26) also has a low Pe of 10% or less. However, in the glass in Case 25, Pe is not low enough to reach 8.0% or less. In each of the glasses in Cases 23, 24 and 26, the content of $Fe_2O_3$ is low and Te is high. Further, in the glass in Case 24, Dw is high with respect to Pe, so that the color tone as a gray glass cannot be achieved. The glasses in Cases 23 and 26 have high $Tv_{D65}$ of 65.7 and 70.1 respectively. On the contrary, the glass in Case 25 has low $Tv_{D65}$ of 10.0, and not only the solar direct transmittance but also the visible light transmittance are too low. Further, in the glasses in Cases 23 to 25, fining by the addition of $Na_2SO_4$ is not performed. In addition, each of the glasses in Cases 24 to 26 does not have sufficient thermal insulation performance and a satisfactory color since the parameter E is outside the range expressed by $365 \leq E \leq 2710$.

While the present invention has been described in detail and with reference to specific embodiments thereof, it will be apparent to one skilled in the art that various changes and modifications can be made therein without departing from the spirit and scope thereof. This application is based on Japanese Patent Application No. 2015-211679 filed on Oct. 28, 2015, the entire subject matters of which are incorporated herein by reference.

INDUSTRIAL APPLICABILITY

A soda lime glass in the present invention is suitable for mass production or large-scale production because it can be manufactured at a low cost. Particularly the soda lime glass in the present invention is useful as a glass sheet for a vehicle, a building, or the like.

The invention claimed is:
1. A soda lime glass, wherein
a content of total iron calculated as $Fe_2O_3$, expressed in mass % on an oxide basis, is 0.25 to 0.55%,
a mass proportion of divalent iron calculated as $Fe_2O_3$ in the total iron calculated as $Fe_2O_3$ is 30 to 50%,
a content of total sulfur calculated as $SO_3$, expressed in mass % on an oxide basis, is 0.003 to 0.1%,
a content of Se expressed in mass ppm is 3 ppm or more,
visible light transmittance $Tv_{D65}$ in accordance with ISO-9050:2003 is 30 to 55% calculated as 6 mm thickness of a glass sheet,
solar direct transmittance Te in accordance with ISO-13837A:2008 is 20 to 40% calculate as 6 mm thickness of a glass sheet, and
excitation purity Pe in accordance with JIS Z 8701(1999) is 8.0% or less calculated as 6 mm thickness of a glass sheet, and wherein the soda lime glass does not substantially contain a manganese (Mn) component.

2. The soda lime glass according to claim 1, comprising, expressed in mass % on an oxide basis:
SiO$_2$: 65 to 75%;
Al$_2$O$_3$: 0 to 6%;
MgO: 0 to 10%;
CaO: 5 to 12%;
Na$_2$O: 5 to 18%; and
K$_2$O: 0 to 5%.

3. The soda lime glass according to claim 1, wherein the mass proportion of divalent iron calculated as Fe$_2$O$_3$ in the total iron calculated as Fe$_2$O$_3$ is 34 to 50%.

4. The soda lime glass according to claim 1, wherein the content of Se expressed in mass ppm is 6 ppm or more.

5. The soda lime glass according to claim 1, wherein a content of total Co calculated as CoO, expressed in mass ppm on an oxide basis, is 1 to 100 ppm.

6. The soda lime glass according to claim 1, wherein the content of total Co calculated as CoO, expressed in mass ppm on an oxide basis, is 15 to 100 ppm.

7. The soda lime glass according to claim 1, wherein the content of total Co calculated as CoO, expressed in mass ppm on an oxide basis, is 41 to 100 ppm.

8. The soda lime glass according to claim 1, wherein a content of CeO$_2$, expressed in mass % on an oxide basis, is 1% or less.

9. The soda lime glass according to claim 1, wherein a content of MnO$_2$ or MnO, expressed in mass % on an oxide basis, is 0.0015% or less.

10. The soda lime glass according to claim 1, wherein the following condition is satisfied:

$$365 \leq E \leq 2710$$

wherein parameter E is defined as follows:

$$E = -10 \times [Fe_2O_3] \times [Fe\text{-}Redox]/100 + (65 \times [Fe_2O_3] \times (1 - [Fe\text{-}Redox]/100))^2 + 0.5 \times [Se] + 0.58 \times [CoO]^{1.76},$$

wherein

[Fe$_2$O$_3$] is the content of the total iron calculated as Fe$_2$O$_3$ (expressed in mass % on an oxide basis),

[Fe-Redox] is the mass proportion (%) of the divalent iron calculated as Fe$_2$O$_3$ in the total iron calculated as Fe$_2$O$_3$,

[Se] is the content of Se (mass ppm), and

[CoO] is the content of total Co calculated as CoO (expressed in mass ppm on an oxide basis).

11. The soda lime glass according to claim 10, wherein the following condition is satisfied:

$$400 \leq M \leq 2900$$

wherein parameter M is defined as follows:

$$M = E + 1000 \times [SO_3], \text{ wherein}$$

[SO$_3$] is the content of total residual sulfur calculated as SO$_3$ (expressed in mass % on an oxide basis).

12. The soda lime glass according to claim 1, wherein a ratio Tv$_{\_D65}$/Te of the Tv$_{\_D65}$ to the Te is 1.0 or more calculated as 6 mm thickness of the glass sheet.

13. The soda lime glass according to claim 1, wherein a coordinate in an L*a*b* color space in accordance with JIS Z 8781-4:2013 satisfies $-11 \leq a^* \leq 1$ and $-10 \leq b^* \leq 10$.

14. The soda lime glass according to claim 1, wherein a relationship between the Pe and a dominant wavelength Dw (nm) of transmitted light in accordance with JIS Z 8701 (1999) is satisfied by one of the following relationships, when Pe is:

$$0 \leq Pe \leq 2.3, \text{ then } 416 \leq Dw \leq 586;$$

$$2.3 \leq Pe \leq 3.0, \text{ then } 470 \leq Dw \leq 524; \text{ and}$$

$$3.0 \leq Pe \leq 8.0, \text{ then } 470 \leq Dw \leq 520.$$

15. The soda lime glass according to claim 1, wherein the visible light transmittance TV$_{\_D65}$ in accordance with ISO-9050:2003 is 30 to 50% calculated as 6 mm thickness of a glass sheet.

16. A method for manufacturing a soda lime glass sheet comprising the soda lime glass according to claim 1, the method comprising:

(1) preparing a glass raw material to have a glass composition in which
a content of total iron calculated as Fe$_2$O$_3$, expressed in mass % on an oxide basis, is 0.25 to 0.55%,
a content of total sulfur calculated as SO$_3$, expressed in mass % on an oxide basis, is 0.003 to 0.1%, and
a content of Se expressed in mass ppm is 3 ppm or more;

(2) melting the glass raw material to obtain a molten glass; and (3) shaping the molten glass to obtain a soda lime glass sheet, wherein the melting in (2) is performed with an amount of a reducing agent added so that a mass proportion of divalent iron calculated as Fe$_2$O$_3$ in the total iron calculated as Fe$_2$O$_3$ is 30 to 50%, and a residual ratio of Se in the glass is 3.33% or more based on an added amount of Se, and wherein the soda lime glass sheet does not substantially contain a manganese (Mn) component.

17. The manufacturing method according to claim 16, wherein an amount of the added reducing agent is 0.001 mass % or more when an amount of the glass raw material is regarded as 100 mass %.

* * * * *